United States Patent
Toda

(10) Patent No.: US 9,374,168 B2
(45) Date of Patent: Jun. 21, 2016

(54) THERMAL TUNING OF OPTICAL DEVICES

(71) Applicant: FUJITSU LIMITED, Kawasaki-shi, Kanagawa (JP)

(72) Inventor: Asako Toda, Santa Clara, CA (US)

(73) Assignee: FUJITSU LIMITED, Kawasaki (JP)

( * ) Notice: Subject to any disclaimer, the term of this patent is extended or adjusted under 35 U.S.C. 154(b) by 24 days.

(21) Appl. No.: 14/284,186

(22) Filed: May 21, 2014

(65) Prior Publication Data

US 2015/0341122 A1 Nov. 26, 2015

(51) Int. Cl.
*H04B 10/50* (2013.01)
*H04B 10/564* (2013.01)
*G02F 1/01* (2006.01)

(52) U.S. Cl.
CPC .............. *H04B 10/564* (2013.01); *G02F 1/01* (2013.01)

(58) Field of Classification Search
CPC ............................... G02F 1/01; H04B 10/564
USPC .................................................. 398/182–201
See application file for complete search history.

(56) References Cited

U.S. PATENT DOCUMENTS

| | | | | |
|---|---|---|---|---|
| 3,599,013 A * | 8/1971 | Cope | ........................ | G06G 7/24 327/347 |
| 3,967,105 A * | 6/1976 | Harrington | .............. | G06G 7/24 327/346 |
| 5,023,431 A * | 6/1991 | Roberge | ........................ | 219/494 |
| 5,495,463 A * | 2/1996 | Akagi | .................... | G11B 7/126 369/100 |
| 5,717,712 A * | 2/1998 | Swaminathan | ...... | H04B 10/503 372/107 |
| 6,563,846 B1 * | 5/2003 | Kuo | .................... | H04B 10/1149 372/29.011 |
| 6,567,198 B1 * | 5/2003 | Kang | .................... | H04B 10/572 398/192 |
| 7,061,706 B2 | 6/2006 | Conteras et al. | | |
| 2002/0071458 A1* | 6/2002 | Iwafuji | ................ | H04B 10/506 372/23 |
| 2004/0179778 A1* | 9/2004 | Hayashi | ............... | G05D 23/306 385/34 |
| 2006/0098699 A1* | 5/2006 | Sanchez | .................. | H01S 5/068 372/26 |
| 2010/0303472 A1* | 12/2010 | Miller et al. | .................. | 398/195 |
| 2014/0169724 A1* | 6/2014 | Ingels | ....................... | G02F 1/29 385/9 |

OTHER PUBLICATIONS

Amberg, P.; Chang, E.; Liu, F.; Lexau, J.; Xuezhe Zheng; Guoliang Li; Shubin, I.; Cunningham, J.E.; Krishnamoorthy, A.V.; Ron Ho, "A sub-400 fJ/bit thermal tuner for optical resonant ring modulators in 40 nm CMOS," Solid State Circuits Conference (A-SSCC), 2012 IEEE Asian , vol., No., pp. 29,32, Nov. 12-14, 2012.*

(Continued)

*Primary Examiner* — Ken N Vanderpuye
*Assistant Examiner* — Dibson Sanchez
(74) *Attorney, Agent, or Firm* — Maschoff Brennan

(57) ABSTRACT

A system of thermally tuning an optical device is described. The system may include an optical device configured to output an optical signal. An amplitude of the optical signal may be dependent on a temperature of the optical device. The system may also include a control circuit, an adjust circuit, and a heater circuit. The control circuit may be configured to output a control current. The adjust circuit may be configured to perform an approximate square-root operation on the control current and to output a modified control current. The heater circuit may be coupled to the adjust circuit and may be configured to generate heat based on the modified control current. The heater circuit may also be positioned such that the generated heat affects the amplitude of the optical signal. The control circuit may linearly adjust the control current to approximately linearly adjust the heat generated by the heater.

17 Claims, 6 Drawing Sheets

(56) References Cited

OTHER PUBLICATIONS

Smith, D. T., "A square root circuit to linearize feedback in temperature controllers," Journal of Physics E: Scientific Instruments, vol. 5, Issue 6, pp. 528-529 (1972).*

Sakul, Chaiwat. "A CMOS Square-Rooting Circuits" The 23rd International Technical Conference on Circuits/Systems, Computers and Communications. Department of Telecommunication Technology. Rajamangala University of Technology Srivijaya, Trang, 92000, Thailand. 2008.

K. Padmaraju et al., "Thermal stabilization of a microring modulatorusing feedback control" Optics Express, vol. 20, Issue 27, pp. 27999-28008 (2012).

Erman Timurdogan et al., "Automated Wavelength Recovery for Microring Resonators" CLEO: Science and Innovations, May 6-11, 2012.

* cited by examiner

THERMAL TUNING OF OPTICAL DEVICES

FIELD

The embodiments discussed herein are related to thermal tuning of optical devices.

BACKGROUND

Electromagnetic beams, such as laser beams, are frequently used to transmit digital data, for example, in fiber-optic systems for long-distance telephone and internet communication. Consequently, optical technology plays a significant role in modern telecommunications and data communication. Examples of optical components used in such systems include optical or electromagnetic radiation sources such as light-emitting diodes and lasers, waveguides, fiber optics, lenses and other optics, photo-detectors and other optical sensors, optically-sensitive semiconductors, optical modulators, and others.

Systems making use of optical components often rely upon the precise manipulation of electromagnetic beams at specific wavelengths to accomplish a desired task. The wavelength of an electromagnetic beam may be disturbed by changes in a system, such as changes in electromagnetic energy, voltages and currents, temperature, among other changes. These changes may change the wavelength of the electromagnetic beams and thereby render the system inoperable.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a system of thermally tuning an optical device is disclosed. The system may include an optical device configured to output an optical signal. An amplitude of the optical signal may be dependent on a temperature of the optical device. The system may also include a control circuit, an adjust circuit, and a heater circuit. The control circuit may be configured to output a control current. The adjust circuit may be configured to perform an approximate square-root operation on the control current and to output a modified control current. The heater circuit may be coupled to the adjust circuit and may be configured to generate heat based on the modified control current. The heater circuit may also be positioned such that the generated heat affects the amplitude of the optical signal. The control circuit may linearly adjust the control current to approximately linearly adjust the heat generated by the heater.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

According to an aspect of an embodiment, a system of thermally tuning an optical device is disclosed. Some optical devices may have a resonant wavelength that is dependent on a temperature of the optical device. As a result, a temperature of the optical device may be controlled to control the resonant wavelength of the optical device. The temperature of the optical device may be controlled by controlling an amount of heat generated by a heater circuit located proximate to the optical device. The heat generated by the heater circuit may be controlled based on a control current provided to the heater circuit. The heat generated by the heater circuit, however, may be proportional to the square of the control current. As a result, a linear change in the control current provided to the heater circuit may result in a non-linear change in heat generated by the heater circuit and thus a non-linear change in the temperature of the optical device. A non-linear change in the temperature of the optical device may render tuning of the resonant wavelength more difficult than if a linear change in the control current resulted in a linear or approximately linear change in the heat generated by the heater circuit.

To compensate for the non-linear change in heat generated by the heater circuit due to linear changes in the control current, the system may include an adjust circuit. The adjust circuit may receive the control current before the control current is provided to the heater and may perform an approximate square-root operation on the control current to generate a modified control current. The modified control current may be provided to the heater circuit. As a result, a linear change in the control current may result in an approximately linear change in the heat of the heater circuit.

Embodiments of the present disclosure will be explained with reference to the accompanying drawings.

Figure 1:
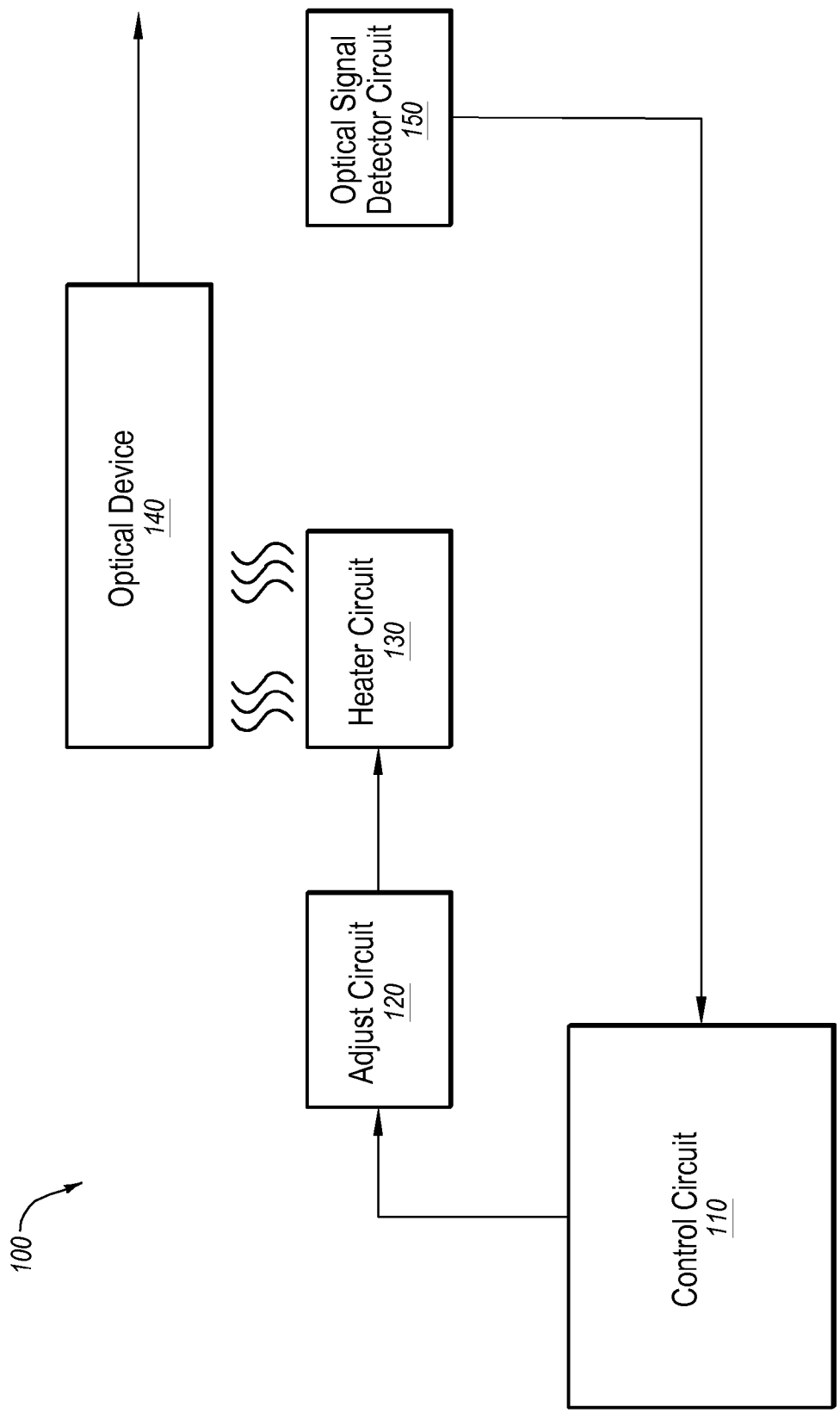
FIG. 1 illustrates an example system of thermally tuning an optical device.

FIG. 1 illustrates an example system 100 (referred to hereinafter as "system 100") of thermally tuning an optical device, arranged in accordance with at least one embodiment described herein. The system 100 includes a control circuit 110, an adjust circuit 120, a heater circuit 130, an optical device 140, and an optical signal detector circuit 150.

The optical device 140 may include an optical modulator such as a Mach-Zehnder modulator, an electro-absorption modulator (EAM), an electro-optic modulator (EOM), or other optical modulator. Alternately or additionally, the optical device 140 may include an optical signal source such as a distributed feedback (DFB) laser, a distributed Bragg reflector (DBR) laser, a Fabry-Perot (FP) laser, or other edge-emitting laser, a vertical cavity surface emitting laser (VCSEL), or other suitable optical signal source.

The optical device 140 may be configured to output an optical signal. The amplitude of the optical signal may vary based on the temperature of the optical device 140. For example, an optical laser may generate an optical signal with a relatively higher amplitude at a certain temperature as compared to another temperature. As another example, when the optical device 140 is an optical modulator and temperature of the optical device 140 changes, the resonant wavelength of the optical device may change. When the resonant wavelength of the optical device 140 is approximately equal to the wavelength of an optical signal being modulated by the optical device 140, the amplitude of the optical signal output by the optical device 140 may be higher than when wavelength of the optical signal is not approximately equal to the resonant wavelength of the optical device 140.

The optical signal detector circuit 150 may be coupled to the control circuit 110. The optical signal detector circuit 150 may be positioned and configured to detect an amplitude of the optical signal output by the optical device 140. The optical signal detector circuit 150 may provide the detected amplitude of the optical signal to the control circuit 110. In some embodiments, the amplitude of the optical signal may be equal to a power of the optical signal.

The control circuit 110 may be coupled to the optical signal detector circuit 150 and the adjust circuit 120. The control circuit 110 may receive, from the optical signal detector circuit 150, an indication of an amplitude of an optical signal output from the optical device 140. Based on the amplitude of the optical signal, the control circuit 110 may generate a control current and provide the control current to the adjust circuit 120. For example, in some embodiments, the control circuit 110 may compare the detected amplitude of the optical signal to a particular amplitude. When the detected amplitude is less than the particular amplitude, the control circuit 110 may increase the control current. When the detected amplitude is more than the particular amplitude, the control circuit 110 may decrease the control current. When the detected amplitude is approximately equal or equal to the particular amplitude, the control circuit 110 may maintain the control current at a previous level.

The adjust circuit 120 may be coupled to the control circuit 110 and the heater circuit 130. The adjust circuit 120 may receive the control current from the control circuit 110 and may be configured to perform an approximate square-root operation on the control current to generate a modified control current. The modified control current may thus be an approximate square-root of the control current. For example, if the control current is 4 milli-amps (ma), the modified control current is an approximate square root of the control current or 2 ma. As another example, the approximate square-root operation may be an operation that includes a square root and one or more constant terms. For example, when the control current is represented by I, performing the approximate square-root operation on the control current may result in the modified control current equaling:

$$\sqrt{\frac{I}{K}} \times N \text{ or } \sqrt{\frac{I}{K}}$$

where K and N are constants. The modified control current may be provided to the heater circuit 130.

In some embodiments, the adjust circuit 120 may be implemented in the analog domain without using digital circuits or digitizing the control current. In these and other embodiments, the control current received by the adjust circuit 120 may be an analog signal. In these and other embodiments, the control circuit 110 may be a digital circuit and may generate a digital control current which may be converted to an analog control current before being received by the adjust circuit 120. Alternately or additionally, the control circuit 110, which may be a digital or an analog circuit, may provide the analog control current to the adjust circuit 120.

The heater circuit 130 may be coupled to the adjust circuit 120 and may be thermally coupled to the optical device 140. The heater circuit 130 being thermally coupled to the optical device 140 may indicate that the heater circuit 130 is positioned in relation to the optical device 140 such that heat radiating from the heater circuit 130 directly affects the temperature of the optical device 140.

The heater circuit 130 may be configured to generate heat based on the modified control current received from the adjust circuit 120. In some embodiments, the generated heat may be proportional to the square of the modified control current. Because the modified control current is a square root of the control current, the heat generated by the heater circuit 130 may be linearly proportional to the control current generated by the control circuit 110. As a result, a linear change in the control current may result in a linear or approximately linear change in the temperature of the optical device 140.

For example, assume that the control current is represented by I and the power, which results in the heat generated by the heater circuit 130, is equal to $R_I^2 \times M$ where $R_I$ is the current received by the heater circuit 130 and M is a constant value. In these and other embodiments, the modified control current may be $\sqrt{I}$. As a result, the power generated by the heater circuit 130 may be equal to $(\sqrt{I})^2 \times M$ or $I \times M$. In short, the approximate square-root operation performed by the adjust circuit 120 may affect the control current such that the second order exponential in the equation for the power may be removed. In some embodiments, while the second order exponential may be removed other linear terms may result because of the removal of the exponential term. For example, as explained above, the modified control current may be represented by one or more of the following equations:

$$\sqrt{\frac{I}{K}} \times N \text{ or } \sqrt{\frac{I}{K}}$$

In these and other embodiments, the square root may result in the elimination of the second order exponentials in the power equation and the N or the K may be linear terms that may result from the adjust circuit 120 adjusting the control current and that may become part of the equation for the power of the heater circuit 130.

As a result, the power, and thereby the heat, generated by the heater circuit 130 may be linearly proportional to the control current output by the control circuit 110. Thus, a linear change in the control current may result in a linear or approximately linear change in the temperature of the optical device 140.

The heat from the heater circuit 130 may change a temperature of the optical device 140. For example, when more heat is generated by the heater circuit 130, the temperature of the optical device 140 may rise. When less heat is generated by the heater circuit 130, the temperature of the optical device 140 may fall. Thus, a change in the heat generated by the heater circuit 130 may affect a change in temperature in the optical device 140. A change in the temperature of the optical device 140 may result in a change in the amplitude of the optical signal output by the optical device 140. The amplitude of the optical signal may be detected by the optical signal detector circuit 150.

An example operation of the system 100 follows. Assume that the optical device 140 is operating at a temperature that may result in the optical signal output by the optical device 140 having an amplitude with a value. The optical signal detector circuit 150 may detect the value of the amplitude and may provide the value of the amplitude to the control circuit 110. The control circuit 110 may compare the value of the amplitude to a particular value. The particular value may be a value of the optical signal when the optical device 140 is operating at a desired temperature.

The value of the first amplitude may be less than the particular value and thus the control circuit 110 may increase the control current. The control current may be square-rooted by the adjust circuit 120 and may be provided to the heater circuit 130. The heater circuit 130 may square the square-rooted control current. Because the control current is increased, the heater circuit 130 may generate more heat and thereby raise the temperature of the optical device 140. The rise in the temperature of the optical device 140 may adjust the amplitude of the optical signal. The optical signal detector circuit 150 may detect the adjusted amplitude of the optical signal and may provide a value of the adjusted amplitude of the optical signal to the control circuit 110. The control circuit 110 may compare the value of the adjusted amplitude to the particular value and adjust the control current accordingly. The system 100 may continue detecting an amplitude of the optical signal and adjusting the control current based on the detected amplitude to adjust a heat generated by the heater circuit 130 and thus the temperature of the optical device until the detected amplitude of the optical signal is equal or approximately equal to the particular value in the control circuit 110. When the detected amplitude of the optical signal is equal or approximately equal to the particular value in the control circuit 110, the optical device 140 may be operating at the desired temperature.

Modifications, additions, or omissions may be made to the system 100 without departing from the scope of the present disclosure. For example, one or more circuits or components may be added between the control circuit 110 and the heater circuit 130 to further adjust the control current. For example, the control current may be amplified by an amplifier. Alternately or additionally, one or more circuits or components may be added between the optical signal detector circuit 150 and the control circuit 110. In these and other embodiments, the one or more circuits or components may condition or otherwise alter the detected amplitude provided by the optical signal detector circuit 150 to the control circuit 110.

Figure 2:
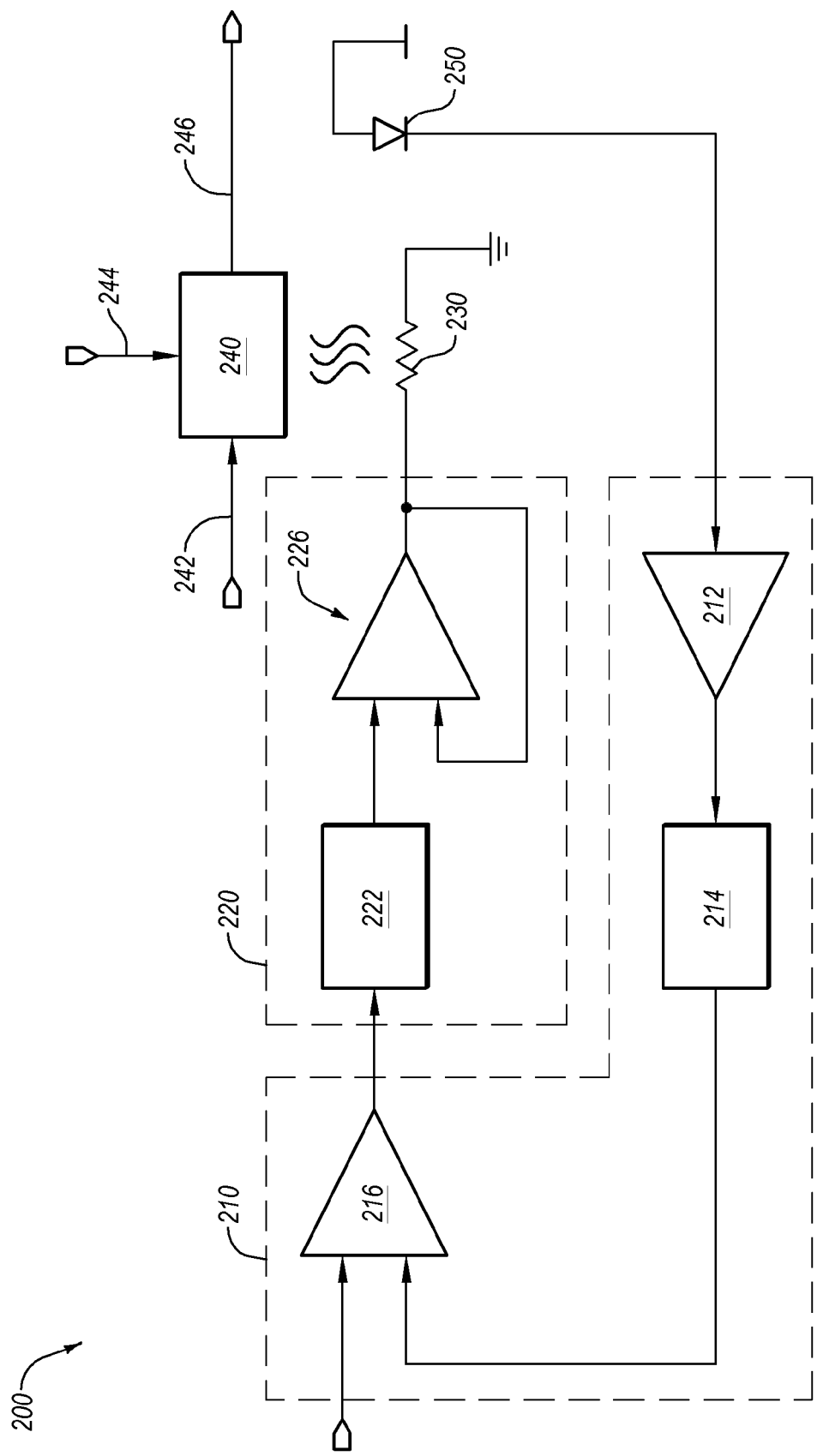
FIG. 2 illustrates another example system of thermally tuning an optical device.

FIG. 2 illustrates another example system 200 (referred to hereinafter as "system 200") of thermally tuning an optical device, arranged in accordance with at least one embodiment described herein. The system 200 includes a control circuit 210, an adjust circuit 220, a resistive element 230, an optical modulator 240, and a photodiode 250.

The optical modulator 240 may be configured to receive an electrical signal 242 and an optical signal 244. The optical modulator 240 may modulate the optical signal 244 using the electrical signal 242. For example, the optical modulator 240 may change a characteristic of the optical signal 244, such as a frequency, amplitude, polarization, or some other characteristic to modulate the optical signal 244 based on the electrical signal 242. In these and other embodiments, the optical modulator 240 may include a Mach-Zehnder modulator, an EAM, an EOM, or other suitable optical modulator.

The optical modulator 240 may further include a resonant frequency. When the resonant frequency of the optical modulator 240 matches or approximately matches the frequency of the optical signal 244, the attenuation of the optical signal 244 when it is modulated may be reduced. As a result, the amplitude of the optical signal 246 output by the optical modulator 240 may be higher when the optical modulator 240 is tuned such that its resonant frequency matches or approximately matches the frequency of the optical signal 244 than when the resonant frequency of the optical modulator 240 does not match or does not approximately match the frequency of the optical signal 244. In some embodiments, the resonant frequency of the optical modulator 240 may be tuned by adjusting the temperature of the optical modulator 240. As a result, varying the temperature of the optical modulator 240 may result in the amplitude of the optical signal 246 varying as well.

The system 200 may use the amplitude of the optical signal 246 as a proxy for determining when the resonant frequency of the optical modulator 240 is approximately equal or equal to the frequency of the optical signal 244. Furthermore, the system 200 may adjust the resonant frequency of the optical modulator 240 in a feedback loop using the amplitude of the optical signal 246 as an element that is fed back for comparison in the feedback loop.

The photodiode 250 may be positioned to receive a portion of the optical signal 246 output by the optical modulator 240. The photodiode 250 is an example of the optical signal detector circuit 150 of FIG. 1. The photodiode 250 may be further configured to generate an amplitude current signal that indicates an amplitude or power of the optical signal 246. The photodiode 250 may provide the amplitude current signal to the control circuit 210.

The control circuit 210 may include a transimpedance amplifier 212, a low-pass filter 214, and a differential current amplifier 216. The transimpedance amplifier 212 may receive the amplitude current signal from the photodiode 250 and may amplify and convert the amplitude current signal to an amplitude voltage signal. The transimpedance amplifier 212 may provide the amplitude voltage signal to the low-pass filter 214. The low-pass filter 214 may pass lower frequency components of the amplitude voltage signal to the differential current amplifier 216.

The differential current amplifier 216 may receive the low-pass filtered amplitude voltage signal on a first input terminal and a reference voltage on a second input terminal. Based on a difference between the low-pass filter amplitude voltage signal and the reference voltage, the differential current amplifier 216 may output a control current and provide the control current to the adjust circuit 220. The reference voltage may be selected such that the difference between the reference voltage and the low-pass filter amplitude voltage signal produces a control current that results in heat of sufficient quantity to cause the optical modulator 240 to have a resonant wavelength equal or approximately equal to the wavelength of the optical signal 244.

The adjust circuit 220 may include a square-root circuit 222 and a buffer circuit 226. The square-root circuit 222 may be configured to receive the control current and to perform an approximate square-root operation on the control current to generate a modified control voltage. The modified control voltage may be provided to the buffer circuit 226. In particular, the modified control voltage may be provided to a first input terminal of a transconductance amplifier included in the buffer circuit 226. A second terminal of the transconductance amplifier may be coupled to an output terminal of the transconductance amplifier. The transconductance amplifier may be configured to generate and output a modified control current based on the modified control voltage output by the square-root circuit 222. The modified control current may be approximately equal or equal to the square root of the control current output by the differential current amplifier 216. The buffer circuit 226 may provide the modified control current to the resistive element 230.

The resistive element 230 may be coupled to the adjust circuit 220 and may be thermally coupled to the optical modulator 240. The resistive element 230 is an example of the heater circuit 130 of FIG. 1. The resistive element 230 may be configured to generate heat based on the modified control current received from the adjust circuit 220. In some embodiments, the modified control current in the resistive element 230 may produce power of $Ic^2 \times R$, where Ic is the modified control current and R is the resistance of the resistive element 230. The power produced by the modified control current Ic may affect the temperature T in the area surrounding the resistive element 230. The following formula describes the temperature T in the area surrounding the resistive element 230 according to some embodiments: $T = I^2 \times R \times Kt$, where Kt is a heat resistivity of a medium surrounding the resistive element 230. The temperature of the area surrounding the resistive element 230 may cause the temperature of the optical modulator 240 to change.

The temperature in the area surrounding the resistive element 230 may be based on the square of the current received by the resistive element 230. Thus, if the control current was not modified before being received by the resistive element 230, a linear change in the control current may result in a non-linear change in the temperature. In contrast, by performing an approximate square-root operation on the control current and providing the modified control current to the resistive element 230, a linear change in the control current may result in a linear or approximately linear change in the temperature of the optical modulator 240.

Modifications, additions, or omissions may be made to the system 200 without departing from the scope of the present disclosure. For example, in some embodiments, the system 200 may include logic for adjusting the reference voltage provided to the differential current amplifier 216.

Figure 3A:
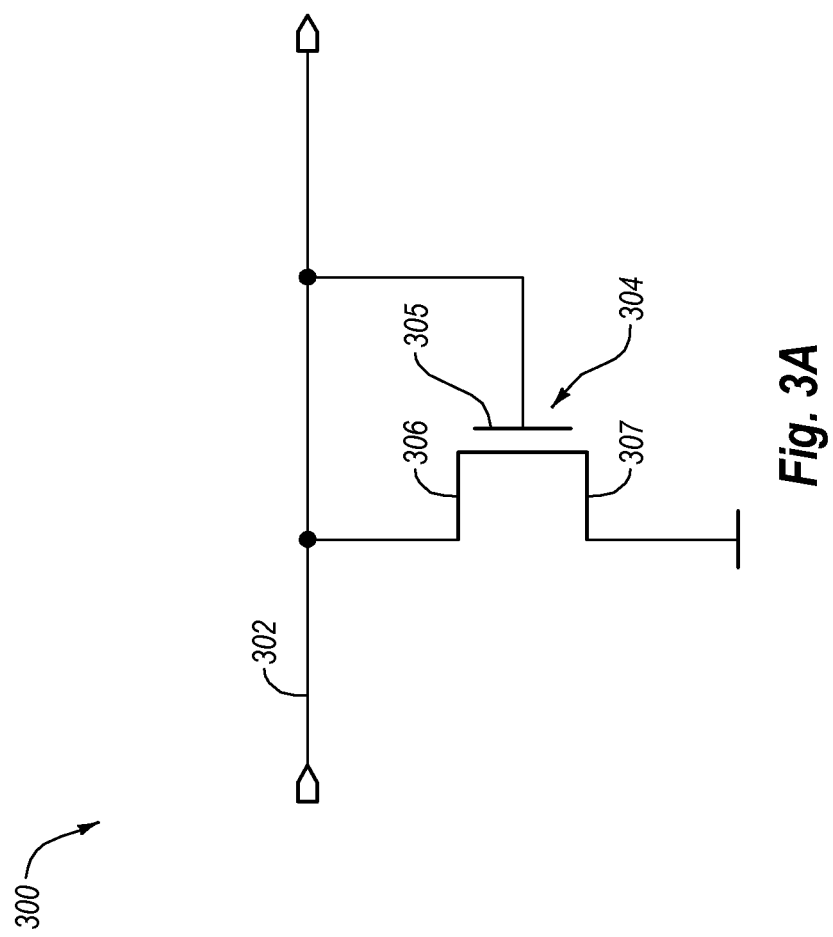
FIG. 3A illustrates an example square-root circuit.

FIG. 3A illustrates an example square-root circuit 300 (referred to hereinafter as "circuit 300"), arranged in accordance with at least one embodiment described herein. The circuit 300 includes a node 302 and a transistor 304. The transistor 304 includes a drain 306, a source 307, and a gate 305. The source 307 may be coupled to a first potential, such as ground. The drain 306 and the gate 305 may be coupled to the node 302. The circuit 300 may be configured such that a current received on the node 302 results in a voltage on the node 302.

The relationship between the current and the voltage may be described based on the following equation:

$$V = \sqrt{\frac{I}{K}} \times Vth$$

where V is the voltage on the node 302, I is the current received at the node 302, Vth is the threshold voltage of the transistor 304, and K is a factor based on physical parameters of the transistor 304. For example, K may be described based on the following equation:

$$K = \left[\frac{\mu C_{ox}}{2}\right]\left[\frac{W}{L}\right]$$

where W is a width of a channel of the transistor 304, L is a length of the channel of the transistor 304, $\mu$ is a surface mobility of the channel of the transistor 304, and $C_{ox}$ is a parameter based on a gate oxide thickness of the transistor 304.

The circuit 300 may be used as part of an adjust circuit in a system of thermally tuning an optical device. For example, the circuit 300 may be used as the square-root circuit 222 of FIG. 2 and/or in the adjust circuit 120 of FIG. 1. In these and other embodiments, the buffer circuit 226 of FIG. 2 may convert the voltage on the node 302 to a current that is provided to the resistive element 230. Modifications, additions, or omissions may be made to the circuit 300 without departing from the scope of the present disclosure.

Figure 3B:
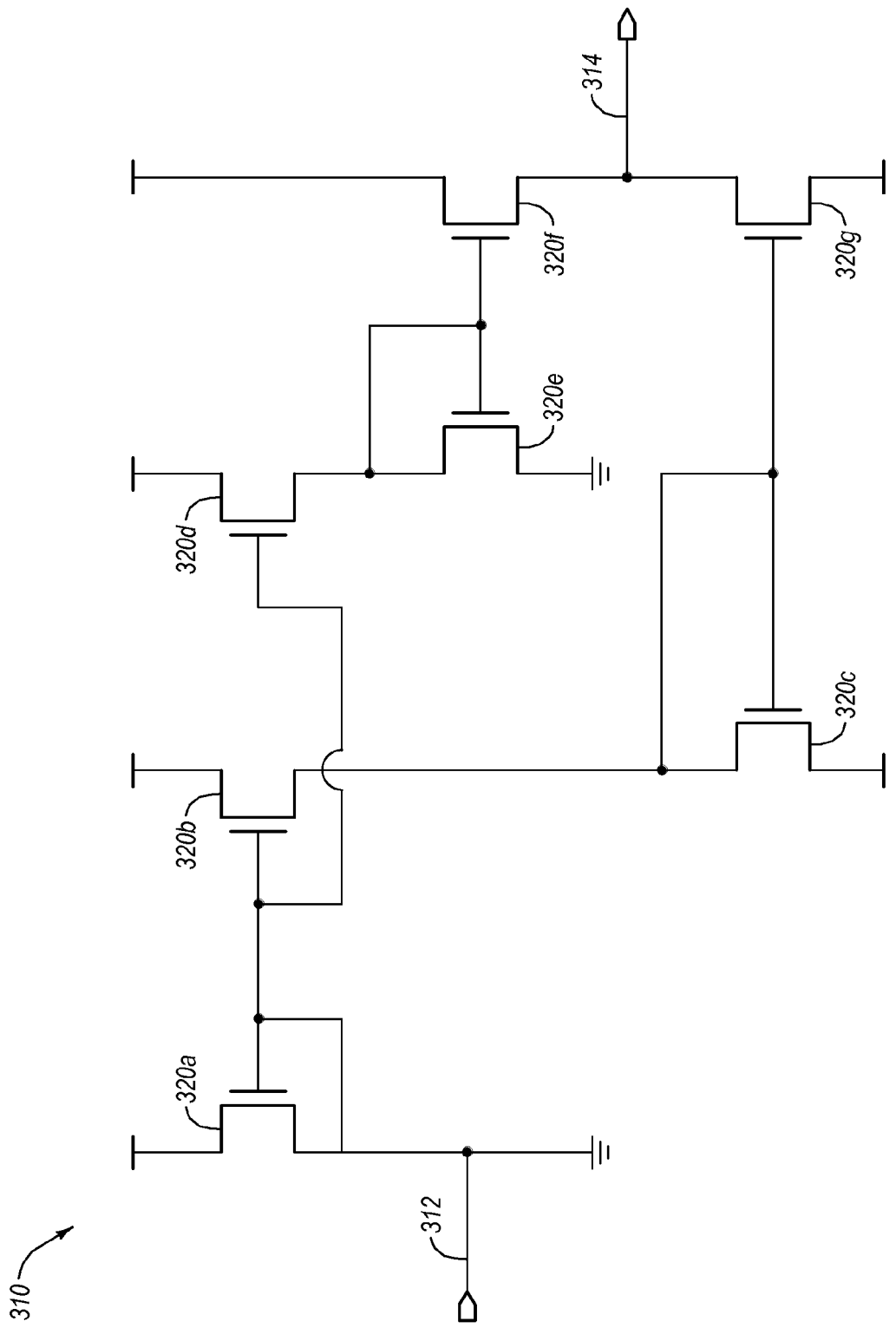
FIG. 3B illustrates another example square-root circuit.

FIG. 3B illustrates another example square-root circuit 310 (referred to hereinafter as "circuit 310"), arranged in accordance with at least one embodiment described herein. The circuit 310 includes an input node 312, an output node 314, and first, second, third, fourth, fifth, sixth, and seventh transistors 320a, 320b, 320c, 320d, 320e, 320f, and 320g, referred to collectively herein as the transistors 320. The transistors 320 may be arranged as illustrated in FIG. 3B. The circuit 310 may be configured such that a current received on the input node 312 results in a voltage on the output node 314.

The relationship between the current received on the input node 312 and the voltage on the output node 314 may be described based on the following equation:

$$V = \sqrt{\frac{I}{K}}$$

where V is the voltage at the output node 314, I is the current at the input node 312, and K is a factor based on physical parameters of the transistors 320. In particular, in some embodiments, the transistors 320 besides the fifth transistor 320e may have similar physical parameters upon which K may be based.

The circuit 310 may be used as part of an adjust circuit in a system of thermally tuning an optical device. For example, the circuit 310 may be used as the square-root circuit 222 of FIG. 2 and/or in the adjust circuit 120 of FIG. 1. In these and other embodiments, the buffer circuit 226 of FIG. 2 may convert the voltage on the output node 314 to a current that is provided to the resistive element 230. Modifications, additions, or omissions may be made to the circuit 310 without departing from the scope of the present disclosure.

Figure 4:
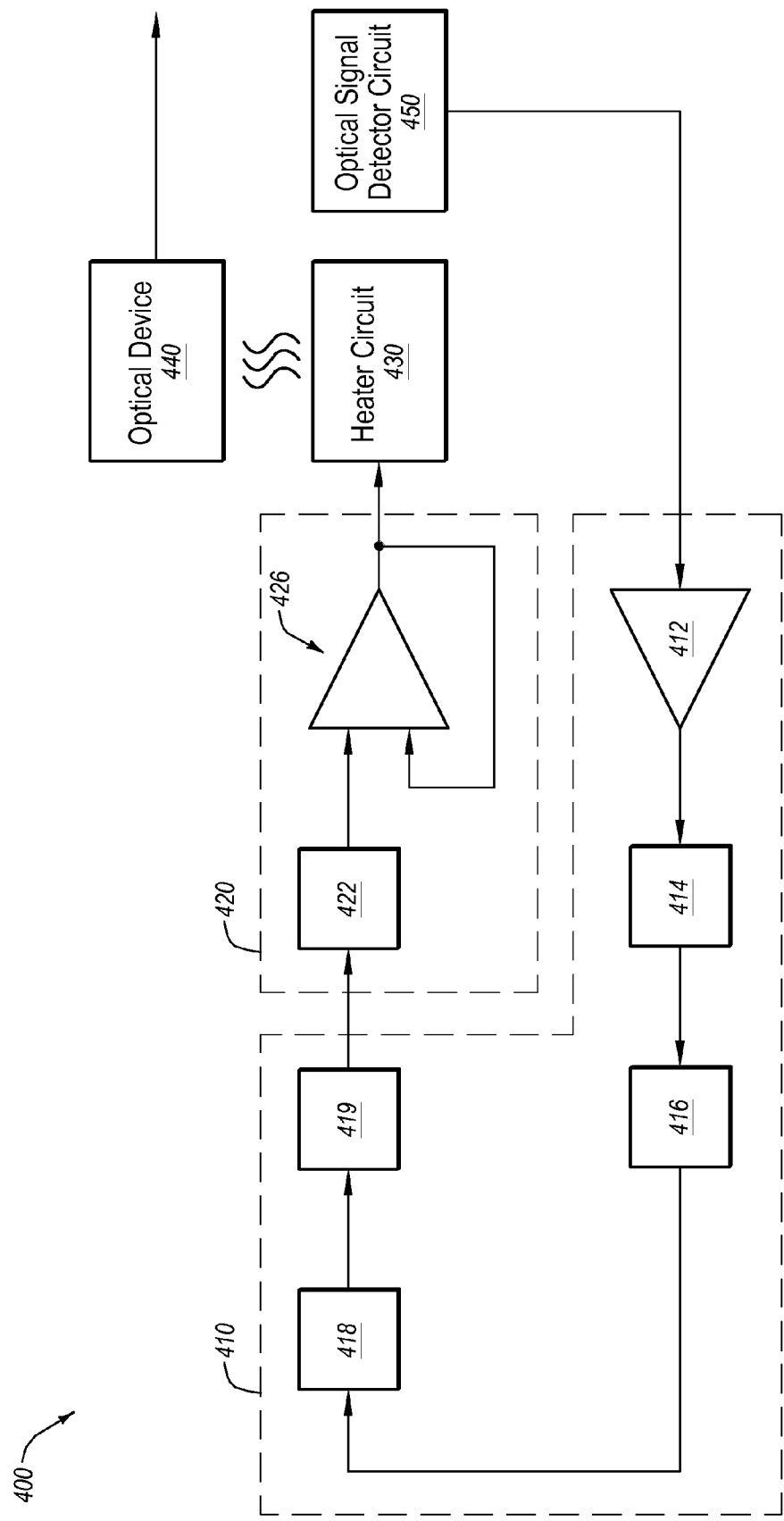
FIG. 4 illustrates another example system of thermally tuning an optical device.

FIG. 4 illustrates another example system 400 (referred to hereinafter as "system 400") of thermally tuning an optical device 440, arranged in accordance with at least one embodiment described herein. The system 400 includes a control circuit 410, an adjust circuit 420, a heater circuit 430, the optical device 440, and an optical signal detector circuit 450.

The optical device 440 may be configured to output an optical signal. The amplitude of the optical signal may vary based on the temperature of the optical device 440. The optical signal detector circuit 450 may be coupled to the control circuit 410. The optical signal detector circuit 450 may be positioned and configured to detect an amplitude of the optical signal output by the optical device 440. The optical signal detector circuit 450 may provide an amplitude current signal based on the detected amplitude of the optical signal to the control circuit 410.

The control circuit 410 may be coupled to the optical signal detector circuit 450 and the adjust circuit 420. The control circuit 410 may include a transimpedance amplifier 412, a low-pass filter 414, an analog to digital converter circuit (ADC) 416, a digital controller 418, and a digital to analog converter circuit (DAC) 419. The transimpedance amplifier 412 may receive the amplitude current signal from the optical signal detector circuit 450 and may amplify and convert the amplitude current signal to an amplitude voltage signal. The transimpedance amplifier 412 may provide the amplitude voltage signal to the low-pass filter 414. The low-pass filter 414 may pass lower frequency components of the amplitude voltage signal to the ADC 416. The ADC 416 may convert the amplitude voltage signal to a digital amplitude voltage signal and may provide the digital amplitude voltage signal to the digital controller 418.

The digital controller 418 may receive the digital amplitude voltage signal. Based on the digital amplitude voltage signal, the digital controller 418 may generate a digital control current. In some embodiments, the digital controller 418 may generate the digital control current based on a comparison between the digital amplitude voltage signal and a particular value. The digital controller 418 may provide the digital control current to the DAC 419. The DAC 419 may convert the digital control current to an analog control current and may provide the analog control current to the adjust circuit 420.

The adjust circuit 420 may include a square-root circuit 422 and a buffer circuit 426 and may be configured to receive the analog control current and to output a modified analog control current. The square-root circuit 422 and the buffer circuit 426 may be analogous to the square-root circuit 222 and the buffer circuit 426 of FIG. 2. Thus, no further description is provided herein with respect to the square-root circuit 422 and the buffer circuit 426 of FIG. 4.

The heater circuit 430 may be coupled to the adjust circuit 420 and may be thermally coupled to the optical device 440. The heater circuit 430 may receive the modified analog control current from the adjust circuit 420 and may generate heat based on the modified analog control current. The heat generated by the heater circuit 430 may be linearly proportional to the digital control current generated by the digital controller 418. As a result, a linear change in the digital control current may result in a linear or approximately linear change in the temperature of the optical device 440.

Modifications, additions, or omissions may be made to the system 400 without departing from the scope of the present disclosure. For example, one or more other circuits or components may be included in the control circuit 410 and/or the adjust circuit 420.

Figure 5:
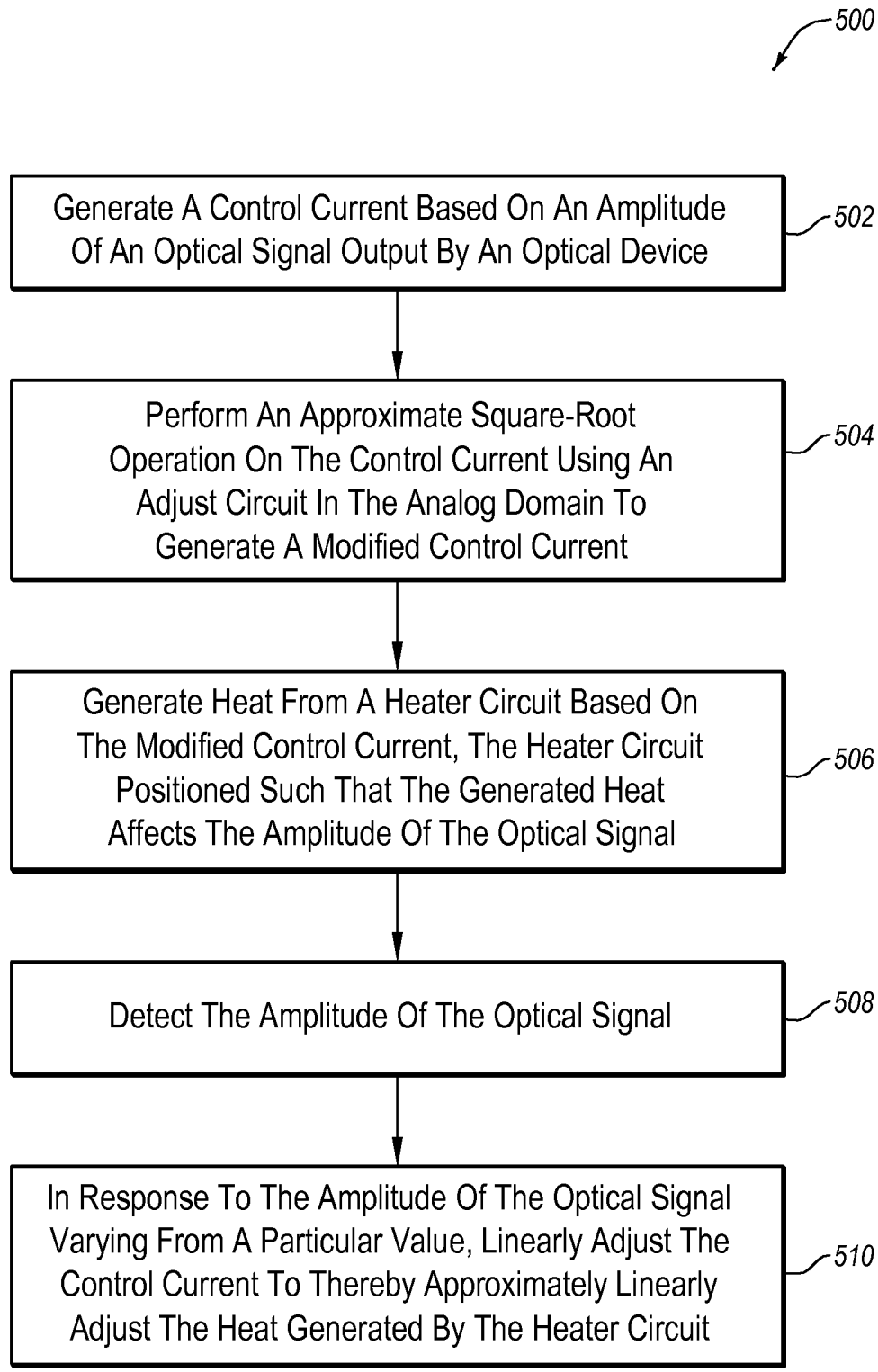
FIG. 5 is a flowchart of an example method of thermally tuning an optical device.

FIG. 5 is a flowchart of an example method 500 of thermally tuning an optical device, arranged in accordance with at least one embodiment described herein. The method 500 may be implemented, in some embodiments, by a system, such as the systems 100, 200, or 400 of FIGS. 1, 2, and 4. Although illustrated as discrete blocks, various blocks may be divided into additional blocks, combined into fewer blocks, or eliminated, depending on the desired implementation.

The method 500 may begin at block 502, where a control current may be generated based on an amplitude of an optical signal output by an optical device. In some embodiments, the optical device may be an optical modulator.

In block 504, an approximate square-root operation may be performed on the control current using an adjust circuit in the analog domain to generate a modified control current.

In block 506, heat from a heater circuit may be generated based on the modified control current. The heater circuit may be positioned such that the generated heat affects the amplitude of the optical signal. In some embodiments, the heat generated based on the modified control current may be proportional to the control current, a factor K based on one or more physical parameters of a transistor in the adjust circuit, and/or a threshold voltage of the transistor in the adjust circuit.

In block 508, the amplitude of the optical signal may be detected. In block 510, in response to the amplitude of the optical signal varying from a particular value, the control current may be linearly adjusted to thereby approximately linearly adjust the heat generated by the heater circuit.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

All examples and conditional language recited herein are intended as pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A system to thermally tune an optical device, the system comprising:
   an optical device configured to output an optical signal, an amplitude of the optical signal being dependent on a temperature of the optical device;
   a control circuit configured to output a control current;
   an adjust circuit coupled to the control circuit and configured to perform an approximate square-root operation on the control current and to output a modified control current, the adjust circuit including:
      a transistor that includes a gate and a drain coupled together, the coupled gate and drain configured to receive the control current; and
      an amplifier circuit that includes an input terminal coupled to the gate and the drain of the transistor and an output terminal configured to output the modified control current; and
   a heater circuit coupled to the adjust circuit and configured to generate heat based on the modified control current, wherein the heater circuit is positioned such that the generated heat affects the amplitude of the optical signal and the control circuit linearly adjusts the control current such that an approximately linearly adjustment occurs of the heat generated by the heater circuit, wherein the heat generated is proportional to the control current, a numerical factor K between 0 and infinity that is based on one or more physical parameters of the transistor, and a threshold voltage of the transistor.

2. The system of claim 1, further comprising an optical signal detector circuit configured:
   to receive the optical signal;
   to generate a detection signal based on the amplitude of the optical signal; and to provide the detection signal to the control circuit, wherein the control circuit is configured to linearly adjust the control current based on the detection signal.

3. The system of claim 2, wherein the optical signal detector circuit includes a photodiode and the control circuit includes a transimpedance amplifier to receive the detection signal and a low-pass filter to filter an output of the transimpedance amplifier.

4. The system of claim 3, wherein the control circuit includes a differential amplifier that receives a reference voltage and an output of the low-pass filter and that generates the control current based on a difference between the reference voltage and the output of the low-pass filter.

5. The system of claim 1, wherein the control circuit includes digital circuitry and the adjust circuit is an analog circuit that applies the approximate square-root in an analog domain.

6. The system of claim 1, wherein the optical device comprises an optical modulator.

7. The system of claim 1, wherein the amplifier circuit includes a transconductance amplifier.

8. A system to thermally tune an optical device, the system comprising:
   a control circuit configured to output a control current;
   an adjust circuit coupled to the control circuit and configured to perform an approximate square-root operation on the control current and to output a modified control current, the adjust circuit including:
      a transistor that includes a gate and a drain coupled together, the coupled gate and drain configured to receive the control current; and
      an amplifier circuit that includes an input terminal coupled to the gate and drain of the transistor and an output terminal configured to output the modified control current; and
   a heater circuit coupled to the adjust circuit and configured to generate heat based on the modified control current.

9. The system of claim 8, further comprising an optical device configured to output an optical signal, an amplitude of the optical signal being dependent on a temperature of the optical device, wherein the control circuit is configured to linearly adjust the control current to approximately linearly adjust the heat generated by the heater circuit such that the amplitude of the optical signal is adjusted.

10. The system of claim 9, further comprising an optical signal detector circuit configured to receive the optical signal, to generate a detection signal based on the amplitude of the optical signal, and to provide the detection signal to the control circuit, wherein the control circuit is configured to linearly adjust the control current based on the detection signal such that the amplitude of the optical signal is adjusted.

11. The system of claim 10, wherein the optical signal detector circuit includes a photodiode and the control circuit includes a transimpedance amplifier to receive the detection signal and a low-pass filter to filter an output of the transimpedance amplifier.

12. The system of claim 11, wherein the control circuit includes a differential amplifier that receives a reference voltage and an output of the low-pass filter and that generates the control current based on a difference between the reference voltage and the output of the low-pass filter.

13. The system of claim 9, wherein the optical device is an optical modulator.

14. The system of claim 8, wherein the control circuit includes digital circuitry.

15. The system of claim 8, wherein the heat generated based on the modified control current is proportional to the control current, a factor K based on one or more physical parameters of the transistor, and a threshold voltage of the transistor.

16. A method of thermally tuning an optical device, the method comprising:
   generating a control current based on an amplitude of an optical signal output by an optical device;
   performing an approximate square-root operation on the control current using an adjust circuit in the analog domain to generate a modified control current, wherein the adjust circuit includes a transistor and an amplifier circuit, the transistor includes a gate and a drain that are coupled together and to the amplifier circuit, and the coupled gate and drain are configured to receive the control current;
   generating heat from a heater circuit based on the modified control current, the heater circuit positioned such that the generated heat affects the amplitude of the optical signal, wherein the generated heat is proportional to the control current, a numerical factor K between 0 and infinity that is based on one or more physical parameters of the transistor, and a threshold voltage of the transistor;
   detecting the amplitude of the optical signal; and
   in response to the amplitude of the optical signal varying from a particular value, linearly adjusting the control current to thereby approximately linearly adjust the heat generated by the heater circuit.

17. The method of claim 16, wherein the optical device comprises an optical modulator.

* * * * *